(12) United States Patent
Papakonstantinou et al.

(10) Patent No.: US 12,619,595 B1
(45) Date of Patent: May 5, 2026

(54) OPTIMISTICALLY CONCURRENT VIEW LOADING

(71) Applicant: Amazon Technologies, Inc., Seattle, WA (US)

(72) Inventors: Yannis Papakonstantinou, La Jolla, CA (US); Tate A. Certain, Seattle, WA (US); Allan Henry Vermeulen, Parksville (CA); Christopher Richard Jacques de Kadt, Seattle, WA (US)

(73) Assignee: Amazon Technologies, Inc., Seattle, WA (US)

( * ) Notice: Subject to any disclaimer, the term of this patent is extended or adjusted under 35 U.S.C. 154(b) by 0 days.

(21) Appl. No.: 16/356,868

(22) Filed: Mar. 18, 2019

(51) Int. Cl.
| | |
|---|---|
| *G06F 16/23* | (2019.01) |
| *G06F 9/46* | (2006.01) |
| *G06F 16/22* | (2019.01) |
| *G06F 16/25* | (2019.01) |

(52) U.S. Cl.
CPC .......... *G06F 16/2343* (2019.01); *G06F 9/466* (2013.01); *G06F 16/2282* (2019.01); *G06F 16/252* (2019.01)

(58) Field of Classification Search
CPC .... G06F 16/2343; G06F 16/252; G06F 9/466; G06F 16/2282
See application file for complete search history.

(56) References Cited

U.S. PATENT DOCUMENTS

| | | | |
|---|---|---|---|
| 4,309,569 | A | 1/1982 | Merkle |
| 4,468,728 | A | 8/1984 | Wang |

| | | | |
|---|---|---|---|
| 4,897,842 | A | 1/1990 | Herz et al. |
| 6,311,179 | B1 | 10/2001 | Agarwal et al. |
| 7,412,424 | B1 | 8/2008 | Tenorio et al. |
| 8,914,404 | B1 | 12/2014 | Kim et al. |
| 8,930,364 | B1 | 1/2015 | Brooker et al. |
| 9,043,355 | B1 | 5/2015 | Kapoor et al. |
| 9,063,978 | B1 | 6/2015 | Kapoor et al. |
| 9,509,652 | B2 | 11/2016 | Ahn et al. |
| 9,881,068 | B2 | 1/2018 | Yeap et al. |

(Continued)

FOREIGN PATENT DOCUMENTS

| | | |
|---|---|---|
| CN | 108924107 A | 11/2018 |
| CN | 108964926 A | 12/2018 |

(Continued)

OTHER PUBLICATIONS

International Search Report and Written Opinion mailed Feb. 26, 2020, in International Patent Application No. PCT/US2019/063103, filed Nov. 25, 2019.

(Continued)

*Primary Examiner* — Ann J Lo
*Assistant Examiner* — Fernando M Mari Valcarcel
(74) *Attorney, Agent, or Firm* — Davis Wright Tremaine LLP

(57) ABSTRACT

A database management system receives a request to execute a long-running transaction. The database management system sub-divides the transaction into a plurality of sub-transactions. The transaction is initiated using optimistic locking. The database management system attempts to execute and validate the sub-transactions. When a sub-transaction fails, it is re-executed after a delay period. When all sub-transactions have been executed and validated, the transaction commits.

20 Claims, 11 Drawing Sheets

(56) References Cited

U.S. PATENT DOCUMENTS

| | | | |
|---|---|---|---|
| 10,496,665 B2 | 12/2019 | Geissinger | |
| 2002/0010701 A1 | 1/2002 | Kosciuszko et al. | |
| 2002/0184504 A1 | 12/2002 | Hughes | |
| 2006/0047713 A1 | 3/2006 | Gorshtein et al. | |
| 2006/0101049 A1* | 5/2006 | Bottomley | G06F 9/466 |
| 2006/0149671 A1 | 7/2006 | Nix et al. | |
| 2006/0190468 A1 | 8/2006 | Mihaila et al. | |
| 2006/0242104 A1* | 10/2006 | Ellis | G06F 16/289 |
| 2009/0083372 A1 | 3/2009 | Teppler | |
| 2009/0106196 A1 | 4/2009 | Gutlapalli et al. | |
| 2010/0049715 A1 | 2/2010 | Jacobsen et al. | |
| 2010/0185847 A1* | 7/2010 | Shasha | G06F 21/606 |
| | | | 711/147 |
| 2011/0055201 A1 | 3/2011 | Burger | |
| 2012/0209822 A1 | 8/2012 | Prabhakar et al. | |
| 2013/0290375 A1 | 10/2013 | Anderson et al. | |
| 2013/0290965 A1* | 10/2013 | Pohlack | G06F 9/467 |
| | | | 718/101 |
| 2013/0325829 A1 | 12/2013 | Agarwal et al. | |
| 2014/0075124 A1* | 3/2014 | Blundell | G06F 9/467 |
| | | | 711/135 |
| 2015/0046413 A1* | 2/2015 | Andrei | G06F 11/1448 |
| | | | 707/695 |
| 2015/0081623 A1 | 3/2015 | Promhouse et al. | |
| 2015/0169356 A1* | 6/2015 | Nagashima | H04L 67/1097 |
| | | | 709/203 |
| 2015/0242439 A1* | 8/2015 | Freedman | G06F 16/2322 |
| | | | 707/703 |
| 2015/0269226 A1* | 9/2015 | Veldhuizen | G06F 16/2315 |
| | | | 707/625 |
| 2015/0378774 A1* | 12/2015 | Vermeulen | G06F 9/466 |
| | | | 707/613 |
| 2016/0379013 A1 | 12/2016 | Ganesan et al. | |
| 2017/0033932 A1 | 2/2017 | Truu et al. | |
| 2017/0041148 A1 | 2/2017 | Pearce | |
| 2017/0048339 A1* | 2/2017 | Straub | G06F 16/2379 |
| 2017/0075902 A1* | 3/2017 | Hoffner | G06F 16/2365 |
| 2017/0134260 A1* | 5/2017 | Davidson | H04L 45/22 |
| 2017/0249361 A1* | 8/2017 | Gordon | G06F 16/9024 |
| 2017/0250815 A1 | 8/2017 | Cuende et al. | |
| 2017/0272250 A1 | 9/2017 | Kaliski, Jr. | |
| 2017/0277709 A1* | 9/2017 | Strauss | G06F 3/064 |
| 2017/0293912 A1 | 10/2017 | Furche et al. | |
| 2017/0301047 A1 | 10/2017 | Brown et al. | |
| 2017/0357680 A1 | 12/2017 | Mackovitch | |
| 2018/0075080 A1* | 3/2018 | Hanai | G06F 16/2246 |
| 2018/0082296 A1 | 3/2018 | Brashers | |
| 2018/0089041 A1 | 3/2018 | Smith et al. | |
| 2018/0096163 A1 | 4/2018 | Jacques de Kadt et al. | |
| 2018/0097779 A1 | 4/2018 | Karame et al. | |
| 2018/0121673 A1 | 5/2018 | Goldfarb et al. | |
| 2018/0129711 A1* | 5/2018 | Richardson | G06F 16/2329 |
| 2018/0137210 A1 | 5/2018 | Bensberg et al. | |
| 2018/0152442 A1 | 5/2018 | Buldas et al. | |
| 2018/0198626 A1 | 7/2018 | Kroonmaa et al. | |
| 2018/0203914 A1 | 7/2018 | Sykora | |
| 2018/0262341 A1 | 9/2018 | Cheng et al. | |
| 2018/0322156 A1* | 11/2018 | Lee | G06F 16/2343 |
| 2018/0330349 A1 | 11/2018 | Uhr et al. | |
| 2018/0331832 A1 | 11/2018 | Pulsifer | |
| 2019/0004789 A1 | 1/2019 | Mills | |
| 2019/0004974 A1 | 1/2019 | Chhabra et al. | |
| 2019/0087600 A1 | 3/2019 | Sion et al. | |
| 2019/0098015 A1 | 3/2019 | Hookham-Miller | |
| 2019/0140819 A1 | 5/2019 | Dolev | |
| 2019/0182047 A1 | 6/2019 | Andreina et al. | |
| 2019/0188706 A1 | 6/2019 | McCurtis | |
| 2019/0236179 A1 | 8/2019 | Priebe et al. | |
| 2019/0253256 A1 | 8/2019 | Saab et al. | |
| 2019/0334726 A1 | 10/2019 | Kelly | |
| 2020/0007581 A1 | 1/2020 | Vouk et al. | |
| 2020/0052884 A1 | 2/2020 | Tong et al. | |
| 2020/0076613 A1 | 3/2020 | Ciscato et al. | |
| 2020/0082361 A1 | 3/2020 | Chan et al. | |
| 2020/0097927 A1 | 3/2020 | Groarke | |
| 2020/0169412 A1 | 5/2020 | Certain et al. | |
| 2020/0387622 A1 | 12/2020 | Falk | |
| 2021/0050989 A1 | 2/2021 | Kempf et al. | |

FOREIGN PATENT DOCUMENTS

| | | | | |
|---|---|---|---|---|
| CN | 108985100 A | 12/2018 | | |
| CN | 109194482 A | 1/2019 | | |
| CN | 113056741 A | 6/2021 | | |
| CN | 113256417 B | 7/2022 | | |
| DE | 102018106682 B4 | 9/2023 | | |
| EP | 818743 A2 | 1/1998 | | |
| EP | 1164510 A2 | 12/2001 | | |
| JP | 5016749 B2 | 9/2012 | | |
| KR | 101829995 B1 * | 2/2018 | | G06F 9/526 |
| KR | 101829729 B1 | 3/2018 | | |
| WO | 0111843 A1 | 2/2001 | | |
| WO | 0219287 A1 | 3/2002 | | |
| WO | 2006009716 A2 | 1/2006 | | |
| WO | 2015187187 A1 | 12/2015 | | |
| WO | 2017079652 A1 | 5/2017 | | |
| WO | 2018161007 A1 | 9/2018 | | |
| WO | 2019078622 A1 | 4/2019 | | |

OTHER PUBLICATIONS

International Search Report and Written Opinion, mailed Feb. 21, 2020, in International Patent Application No. PCT/US2019/063058, filed Nov. 25, 2019.

Wikipedia, "Merkle tree," Oct. 30, 2018, retrieved Feb. 11, 2020, from https://en.wikipedia.org/w/index.php?title=Merkle tree&oldid=866395282, 5 pages.

Haber et al., "How to Time-Stamp a Digital Document," The Journal of Cryptology 3(2):99-111, Jan. 1991.

Oberhaus, "Radioactive Material From Chernobyl Will Help Secure the Next Version of Zcash: How to use toxic waste to generate 'toxic waste,'" Feb. 14, 2018, retrieved Nov. 8, 2019 from https://www.vice.com/en_us/article/gy8yn7/power-tau-zcash-radioactive-toxic-waste, 5 pages.

Oberhaus, "The World's Oldest Blockchain Has Been Hiding in the New York Times Since 1995: This really gives a new meaning to the 'paper of record,'" Apr. 27, 2018, retrieved Nov. 7, 2019 from https://www.vice.com/en_us/article/j5nzx4/what-was-the-first-blockchain, 5 pages.

Oberhaus, "Watch This Hilarious Bitcoin Explainer Generated by an AI: Botnik strikes again with a short Bitcoin explainer made by a predictive text AI that was trained on other Bitcoin explainers," May 23, 2018, retrieved Nov. 7 from https://www.vice.com/en_us/article/xwmy9a/watch-botnik-ai-bitcoin-explainer, 4 pages.

Okrent, "The Public Editor; Paper of Record? No Way, No Reason, No Thanks," Apr. 25, 2004, retrieved Nov. 8, 2019 from https://www.nytimes.com/2004/04/25/weekinreview/the-public-editor-paper-of-record-no-way-no-reason-no-thanks.html, 4 pages.

Whitaker, "The Eureka Moment That Made Bitcoin Possible: A key insight for the technology came to a physicist almost three decades ago at a Friendly's restaurant in New Jersey," May 25, 2018, retrieved Nov. 8, 2019 from https://www.wsj.com/articles/the-eureka-moment-that-made-bitcoin-possible-1527268025, 4 pages.

U.S. Appl. No. 16/200,595, filed Nov. 26, 2018.

U.S. Appl. No. 16/200,584, filed Nov. 26, 2018.

U.S. Appl. No. 16/200,589, filed Nov. 26, 2018.

U.S. Appl. No. 16/200,600, filed Nov. 26, 2018.

Plattner, "A Common Database Approach for OLTP and OLAP Using an In-Memory Column Database," Proceedings of the 2009 ACM SIGMOD International Conference on Management of Data (SIGMOD '09), Jun. 29, 2009, 7 pages.

UK Examination Report mailed Oct. 13, 2022 in Patent Application No. GB2106687.3, 4 pages.

UK Examination Report mailed Sep. 27, 2022 in Patent Application No. GB2106686.5, 7 pages.

UK Examination Report mailed May 27, 2022 in UK Patent Application No. GB2106687.3, filed May 11, 2021, 2 pages.

(56) References Cited

OTHER PUBLICATIONS

UK Examination Report mailed Jan. 16, 2023 in UK Patent Application No. GB2106686.5, 9 pages.
Vishal et al., "Efficient Transaction Processing in Sap Hana Database—The End of a Column Store Myth", SIGMOD, '12, Scottsdale, AZ, May 20-24, 2012, pp. 731-741.
Sikka et al., "Efficient Transaction Processing in SAP HANA Database—The End of a Column Store Myth," SIGMOD 12, May 20-24, 2012, 11 pages.
UK IPO Examination Report of Application No. GB2106687.3 dated Feb. 22, 2023, 4 pages.
Laurie et al., "Certificate Transparency," RFC6962, Internet Engineering Task Force (IETF), Jun. 2013, 27 pages.
UK IPO Examination Report of Application No. GB2106686.5 dated May 18, 2023, 8 pages.
UK IPO Examination Report of Application No. GB2106687.3 dated May 24, 2023, 8 pages.
USPTO Notice of Allowance of U.S. Appl. No. 17/191,520 dated Jan. 26, 2023, 11 pages.
UK IPO Intention to Grant Application No. GB2106687.3 dated Oct. 4, 2023, 2 pages.
Chepurnoy et al., "EDRAX, A Cryptocurrency with Stateless Transaction Validation," Cryptology ePrint Archive, 2018, 18 pages.
Hari et al., "The Internet Blockchain: A Distributed, Tamper-Resistant Transaction Framework for the Internet," ACM Digital Library, Nov. 2016, 7 pages.
UK IPO Decision to Refuse Application No. GB2106686.5 dated Jan. 25, 2024, 11 pages.
USPTO Non-Final Office Action in U.S. Appl. No. 117/517,577 dated Sep. 5, 2024, 21 pages.
USPTO Final Office Action in U.S. Appl. No. 17/517,577 dated Sep. 5, 2024, 21 pages.
USPTO Non-Final Office Action in U.S. Appl. No. 17/517,577 dated Mar. 3, 2025, 24 pages.
USPTO Notice of Allowance in U.S. Appl. No. 17/517,577 dated Jul. 15, 2025, 9 pages.

* cited by examiner

200

D1

Document resulting from
applying list of transactions to
document D1
212

Ledger
202

Summary
204

Journal
206

T1

T2

TN

Immutable list of transactions
performed on document D1
210

600

Figure 7:
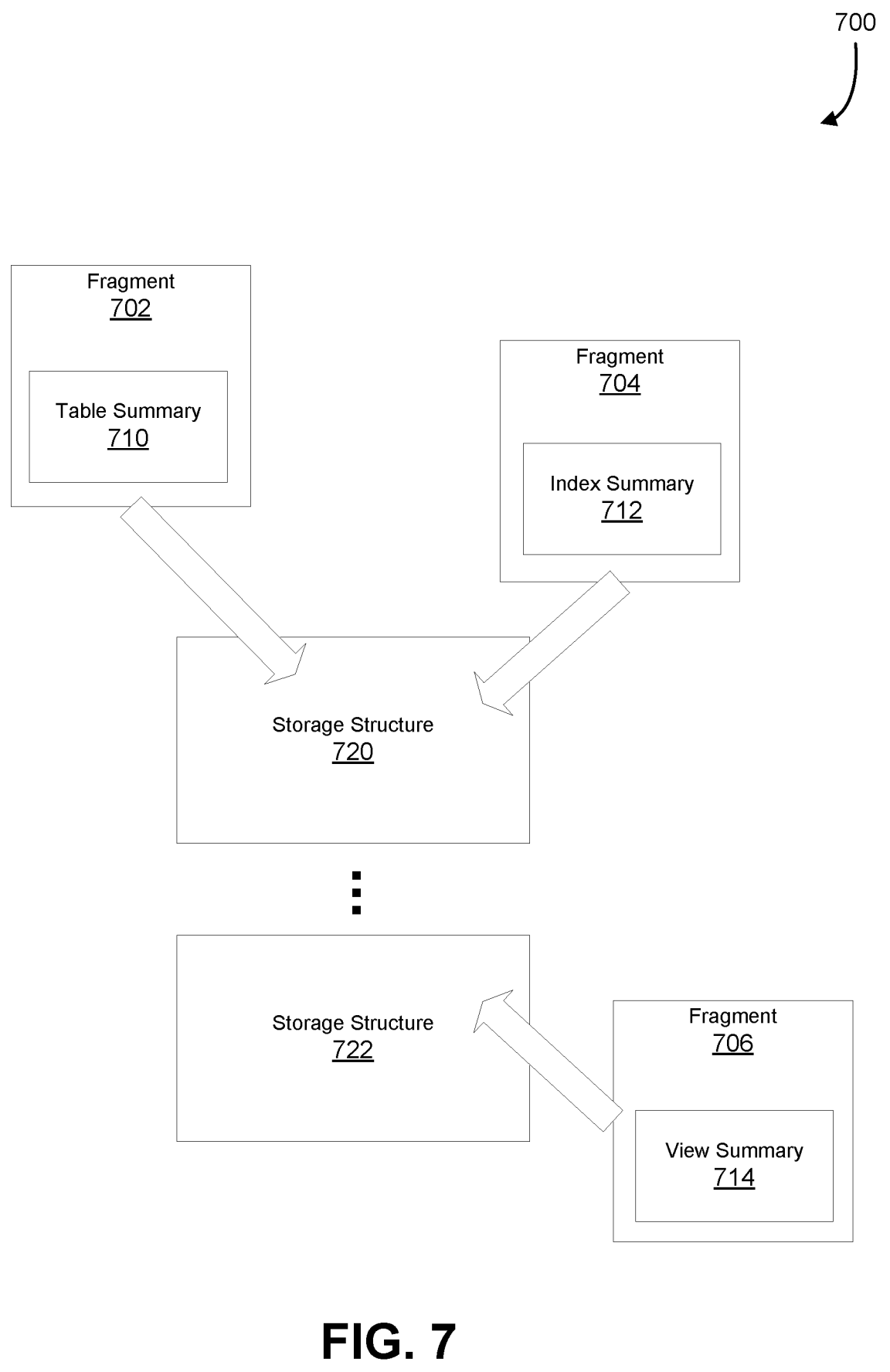

700

Fragment
702

Table Summary
710

Fragment
704

Index Summary
712

Storage Structure
720

Storage Structure
722

Fragment
706

View Summary
714

Analyze transaction request — 902

Identify sub-operations — 904

Initiate transaction under optimistic concurrency model — 906

Execute sub-operations — 908

Validated? — 910

Complete? — 912

Commit transaction — 914

1000

Receiving a request to perform a transaction to create a view — 1002

Identify sub-operations — 1004

Initiate transaction using an optimistic concurrency model — 1006

Determine that a sub-operation has failed validation — 1008

Complete execution of the failed sub-operation after a delay period — 1010

Finalize the transaction in response to validation of the failed sub-operation — 1012

OPTIMISTICALLY CONCURRENT VIEW LOADING

BACKGROUND

Database management systems provide facilities to store and retrieve data. Although a wide variety of database management systems exists, the most popular may be divided into one of two categories. The first category of databases, relational databases, are those built on the relational model and generally supporting tables of fixed-length records. The second category is non-relational databases, which may substitute the comparatively rigid structured query language ("SQL") with other query mechanisms. Databases of both of these categories are widely used. However, database management systems in both categories have their own respective limitations.

BRIEF DESCRIPTION OF THE DRAWINGS

Various techniques will be described with reference to the drawings, in which:

FIG. 7 illustrates aspects of a storage technique for summary data, in accordance with an embodiment;

DETAILED DESCRIPTION

Figure 1:
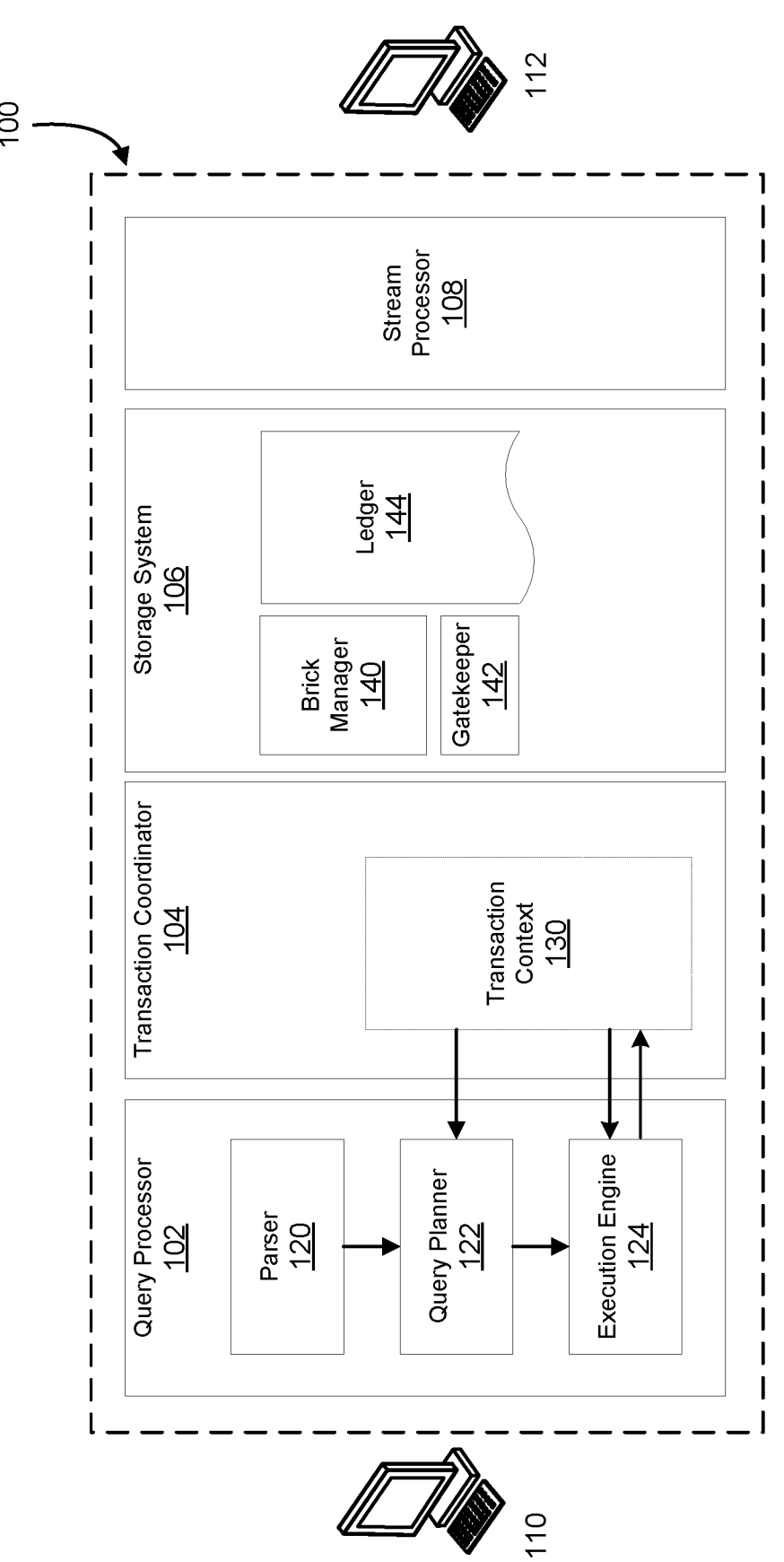
FIG. 1 illustrates a ledger-based database system, in accordance with an embodiment.

Described herein are systems and techniques related to the operation of a ledger-based database management system. A ledger, as used herein, comprises journal and summary data structures adapted for use in a database management system. A journal records an immutable history of transactions performed on a document managed by the system, and a summary provides a synopsis of the document's current state.

In an example embodiment, a ledger-based database management system creates views and indexes. The views and indexes are created using transactions executed under an optimistic concurrency model. Here, a transaction refers to a set of sub-operations that are performed as an atomic unit. The use of an optimistic concurrency model refers to avoiding the acquisition of locks on the database during the reading and processing phases of a transaction. Typically, transactions which create views and indexes are long-running, and as such are likely to be subverted or "starved" by shorter-running transactions. However, embodiments may execute long-running transactions, such as those used to create views or indexes, by attempting to execute the various sub-operations of which the transaction is comprised. If a particular sub-operation fails, it can be re-validated, retried, or re-executed. When all of the sub-operations have successfully completed, the transaction is committed.

In an example embodiment, a ledger based database management system receives a request to create a view or index, where the view or index is to be created by a transaction which comprises a number of sub-operations. The transaction is initiated under optimistic concurrency assumptions, and as such no write locks are acquired on the data at least until a later commit phase, although certain embodiments may also avoid locking during the commit phase. The sub-operations are executed. When a sub-operation fails validation, e.g., by having the data it depends on written to by another transaction, the system attempts to complete execution of the sub-operation after a delay period. When all sub-operations successfully complete, the transaction is committed and the creation of the view or index is completed.

As noted, the example embodiment initiates the transaction under an optimistic concurrency model, which may also be described as optimistic locking, or optimistic concurrency assumptions, and so forth. Optimistic concurrency is described as such because it is based on an assumption that no conflicts will arise in between the time data is write operations are prepared and the time the write operations are applied to the underlying data. Note that this assumption is sometimes wrong, and as such embodiments confirm the serializability of the transaction prior to committing the transaction. Confirming the serializability of a transaction comprises confirming that the outcome of a transaction (in this example, a long-running transaction) has not been affected by an intervening transaction.

In the preceding and following description, various techniques are described. For purposes of explanation, specific configurations and details are set forth in order to provide a thorough understanding of possible ways of implementing the techniques. However, it will also be apparent that the techniques described below may be practiced in different configurations without the specific details. Furthermore, well-known features may be omitted or simplified to avoid obscuring the techniques being described.

As one skilled in the art will appreciate in light of this disclosure, certain embodiments may be capable of achieving certain advantages, including some or all of the following. Embodiments are capable of more efficient creation of indexes or views. By avoiding the acquisition of locks during a long-running transaction to create a view of index, the data being indexed remains usable during the long-running transaction.

FIG. 1 illustrates a ledger-based database system, in accordance with an embodiment. The example ledger-based database system 100 comprises a query processor 102, transaction coordinator 104, storage system 106, and stream processor 108.

A client device 110 may send queries to the database system 100. Here, a query refers to a request for information to be retrieved by the database system 100, expressed in accordance with a query language definition and a schema. For example, a query might be expressed in structured query language ("SQL"), or a variant thereof, and might further conform to the schema of a table referenced by the query. Schema refers to the names and structure of a table or other element, such as a view or index. A query that conforms to a schema refers to names and structures consistent with the schema. For example, the projection clause of a query may generally refer only to columns of a table that exist in the corresponding schema, except for special circumstances such as projection columns that are defined by the query itself.

A client device 112 may also access stream functions of the distributed database system 100. Alternatively, various hosted services may access stream functions. Here, stream functions refers to features of the distributed database that relate to direct and/or immediate access to a stream of transactions processed by, about to be processed by, or being processed by, the database system 100.

In an embodiment, a query processor 102 comprises a module operative on a computing device comprising at least one processor and a memory. As used herein, a module or sub-module refers to a portion of the memory in which processor-executable instructions are stored, where the instructions, when executed by the processor, cause the computing device to perform the functions attributed to the module. The query processor 102 performs functions related to processing queries received from the client device 110. The query processor 102 may comprise a parser 120, query planner 122, and execution engine 124. The database system 100 may comprise a fleet of query processors similar to the query processor 102 depicted in FIG. 1, to facilitate scaling.

In an embodiment, the parser 120 performs lexical and semantic analysis of a received query. This may include converting textual components of the received query to non-textual data structures, such as abstract syntax trees. It may further involve determining whether the query is syntactically valid, and valid with respect to any relevant schemas.

In an embodiment, the query planner 122 determines a plan for executing the received query. This may involve identifying various approaches to executing the query, estimating the costs of the various approaches, and selecting a plan believed by the query planner 122 to be most optimal. The query planner 122 may rely on various statistics, some of which may be provided by the storage system 106, regarding the amounts of relevant data stored by the storage system 106, how long it might take to scan or retrieve the relevant data, and so forth.

In an embodiment, the execution engine 124 obtains a plan for executing the query from the query planner 122, and executes the plan. Executing the plan may generally involve initiating scanning and retrieval of data, and assembling the results of the query. The execution engine, for example, may process a query by initiating a scan of a summary table or journal, or initiating some other operation, in order to retrieve data relevant to the query. The scanning and retrieval is performed by the storage system 106. The execution engine, in cases and embodiments, assembles the results of the query by performing join operations, filtering operations, and so on. The execution engine also applies a projection, as reflected in the original query and in the query plan. This step ensures that the assembled results conform to the expected schema.

In an embodiment, a transaction coordinator 104 comprises a module operative on a computing device comprising at least one processor and a memory. The transaction coordinator 104 can be co-located on a computing device with other modules, such as the query processor 102, or it may be located on a separate computing device. The database system 100 may comprise a fleet of transaction coordinators similar to the transaction coordinator 104 depicted in FIG. 1, to facilitate scaling.

The transaction coordinator manages query execution and command execution, to implement transactional properties such as atomicity, consistency, isolation, and durability. These are sometimes referred to as "ACID" properties. The transaction coordinator 104 communicates with the query processor 102 and storage system 106 to ensure that queries and command intended to be performed in a transaction context 130, are executed according to desired levels of ACID conformance.

In an embodiment, a storage system 106 comprises a module operative on a computing device comprising at least one processor and a memory. The storage system 106 can be co-located on a computing device with other modules, or located on a separate computing device. The database system 100 may comprise a fleet of storage systems similar to the storage system 106 depicted in FIG. 1, to facilitate scaling. The storage system 106 may comprise various sub-modules, including a brick manager 140, gateway 142, and ledger 144. Further aspects of these components of the storage system 106 are described herein. In general, the storage system 106 is responsible for performing storage and retrieval operations on the ledger 144.

In an embodiment, a stream processor 108 comprises a module operative on a computing device comprising at least one processor and a memory. The stream processor 108 can be co-located on a computing device with other modules, or located on a separate computing device. The database system 100 may comprise a fleet of stream processors similar to the stream processor 108 depicted in FIG. 1, to facilitate scaling. The stream processor 108 provides direct or immediate access to a stream of transactions processed by, about to be processed by, or being processed by, the database system 100. Various client devices and hosted client applications, such as the depicted client device 112, may access the stream of transactions and respond to the transactions as they occur.

Figure 2:
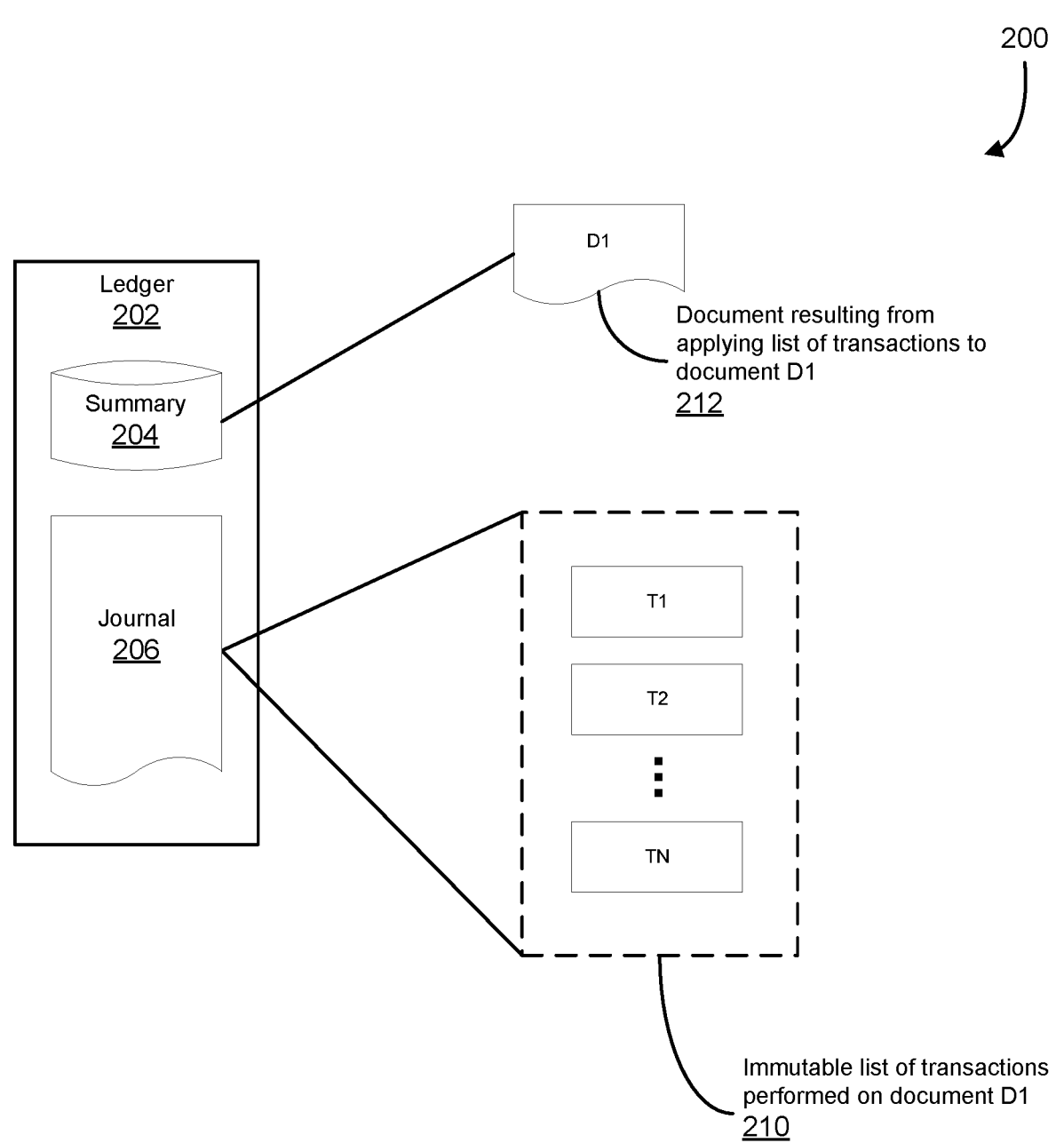
FIG. 2 illustrates distributed storage of a ledger used in conjunction with a ledger-based database system, in accordance with an embodiment.

The database system 100 of FIG. 1 is described as being ledger-based because it uses a ledger as its underlying storage structure. FIG. 2 illustrates distributed storage of a ledger used in conjunction with a ledger-based database system, in accordance with an embodiment. The ledger 202 of FIG. 2 may therefore correspond to the ledger 144 that FIG. 1 depicts.

The principal components of a ledger are one or more journals of immutable transactions, and a summary that reflects the results of those transactions. As depicted in the example 200 of FIG. 2, a ledger 202 comprises a journal 206 and a summary 204. The ledger 202 of FIG. 2 corresponds to the ledger 144 of FIG. 1.

The ledger 202 comprises a list of immutable transactions applied to documents or other data maintained by the distributed database 100. For example, the ledger 202 might comprises a list 210 of transactions performed on a document D1. The transactions are considered immutable because, once entered into the journal 206, they are neither changed nor deleted. The journal 206, in various embodiments, thus contains a complete and verifiable history of all changes made to the document D1.

The ledger 202 further comprises a summary 204. The summary 204 reflects the contents or state of each document stored in the database after applying all of the committed transactions, in order. For example, the summary 204 might contain the document 212 resulting from applying the list 210 of transactions applied to the document D1.

In various embodiments, the database system 100 supports queries of tables and views, and the use of indexes, in a manner that at least appears to the user to be similar to that of traditional relational database management systems. The database system 100, in various embodiments, provides a session-based transactional application programming interface ("API").

Through the interface, using a superset of SQL, client devices may interact with documents, tables, views, and indexes, despite the difference in the underlying storage structures.

Figure 3:
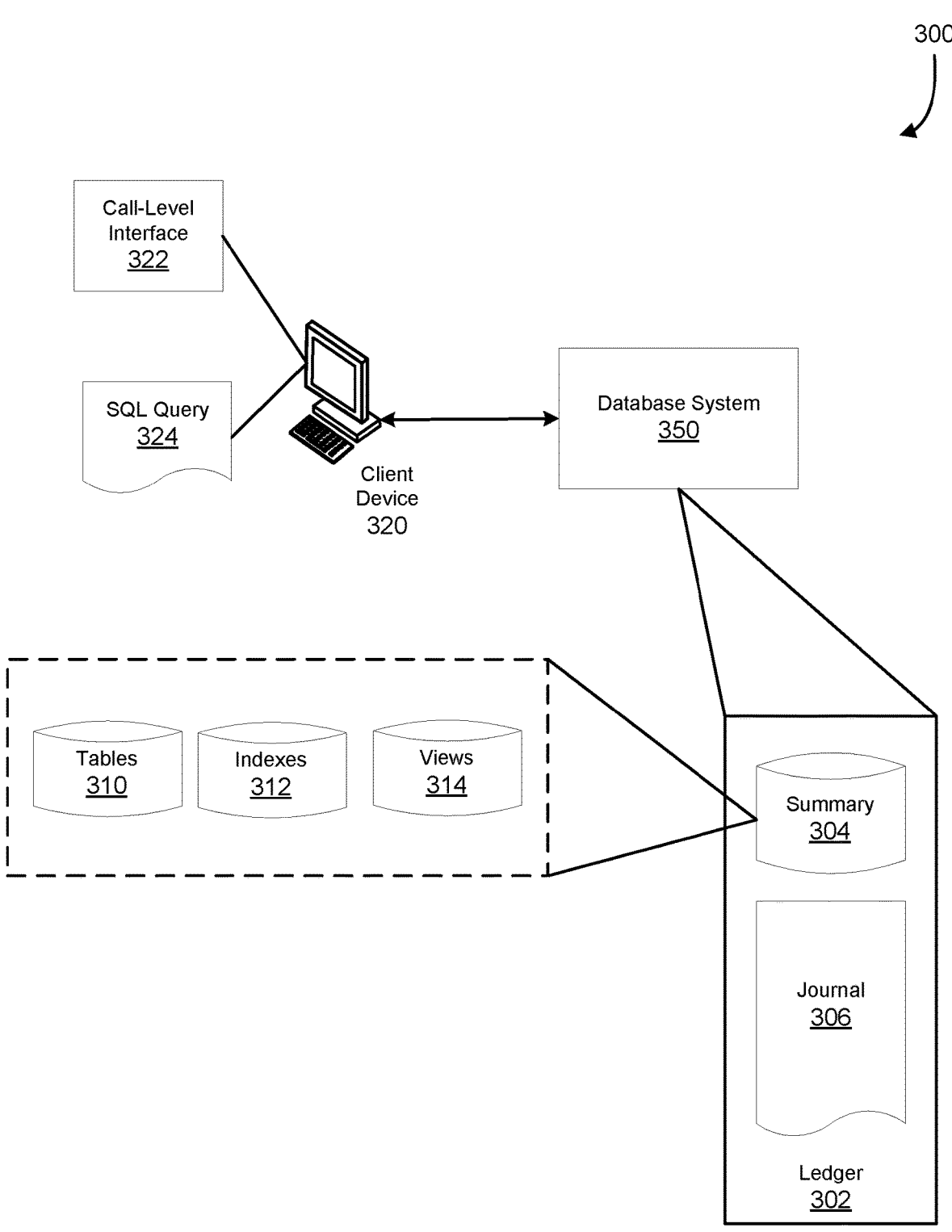
FIG. 3 illustrates aspects of query processing in a ledger-based database system, in accordance with an embodiment.

FIG. 3 illustrates aspects of query processing in a ledger-based database system, in accordance with an embodiment. In the example 300 of FIG. 3, the ledger 302, summary 304, and journal 306 may correspond to the ledger, summary, and journal depicted in FIG. 2.

In various embodiments, a client device 320, or more generally a client process, sends a SQL query 324 to a database system 350, using a call-level interface 322. The database system 350 depicted in FIG. 3 may correspond to the database system 100 depicted in FIG. 1. The call-level interface 322 can be an API for interacting with a database system, such as various available connectivity interfaces. The SQL queries 324 can be queries expressed in SQL, or a superset or subset thereof. Note, however, that the use of SQL in this example should not be construed so as to limit the scope of the present disclosure to embodiments which use SQL. Embodiments may use any of a wide variety of query languages.

The summary 304 stores data that represents the current state of the ledger's tables 310, indexes 312, and views 314. Aspects of storage techniques for the summary data are described below, regarding FIG. 7.

A query, such as the SQL query 324, can be processed in view of the data contained in the summary 304. For example, a query execution plan might rely on current data stored in the summary, such as index data, to efficiently execute a query. The query execution plan might further rely on current values for elements of a document when applying a projection.

Figure 4:
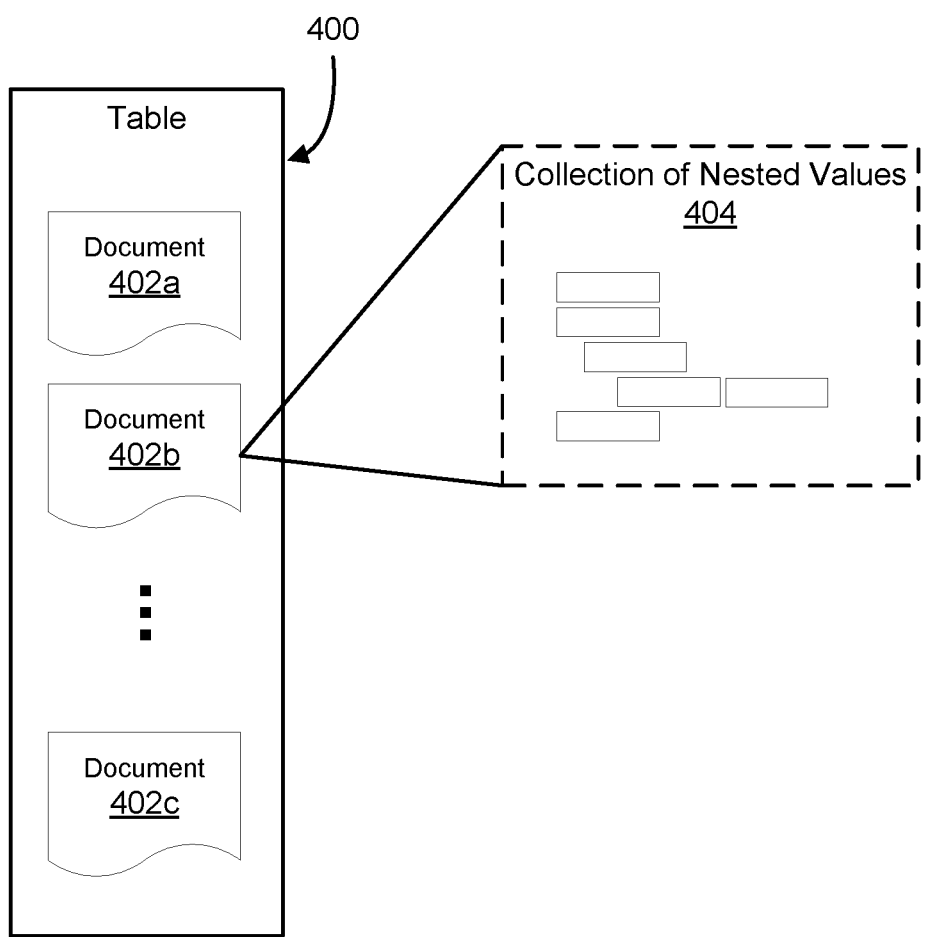
FIG. 4 illustrates a table structure of a ledger-based database system, in accordance with an embodiment.

The tables of the database system 100 are logically organized as collections of documents. FIG. 4 illustrates a table of a ledger-based database system, in accordance with an embodiment. As depicted by FIG. 4, a table 400 comprises a collection of documents 402a-c. A document 402 might also be described as a row of the table. However, in various embodiments, each document can comprise a collection of nested values 404. Accordingly, embodiments may support more loosely structured data than what is typically supported by conventional database management systems.

The example table 400 may generally be treated as a logical entity exposed to a client device via a query language, rather than a physical data storage structure. As described herein, the data for the table 400 is stored using a ledger comprising journal and summary portions.

Figure 5:
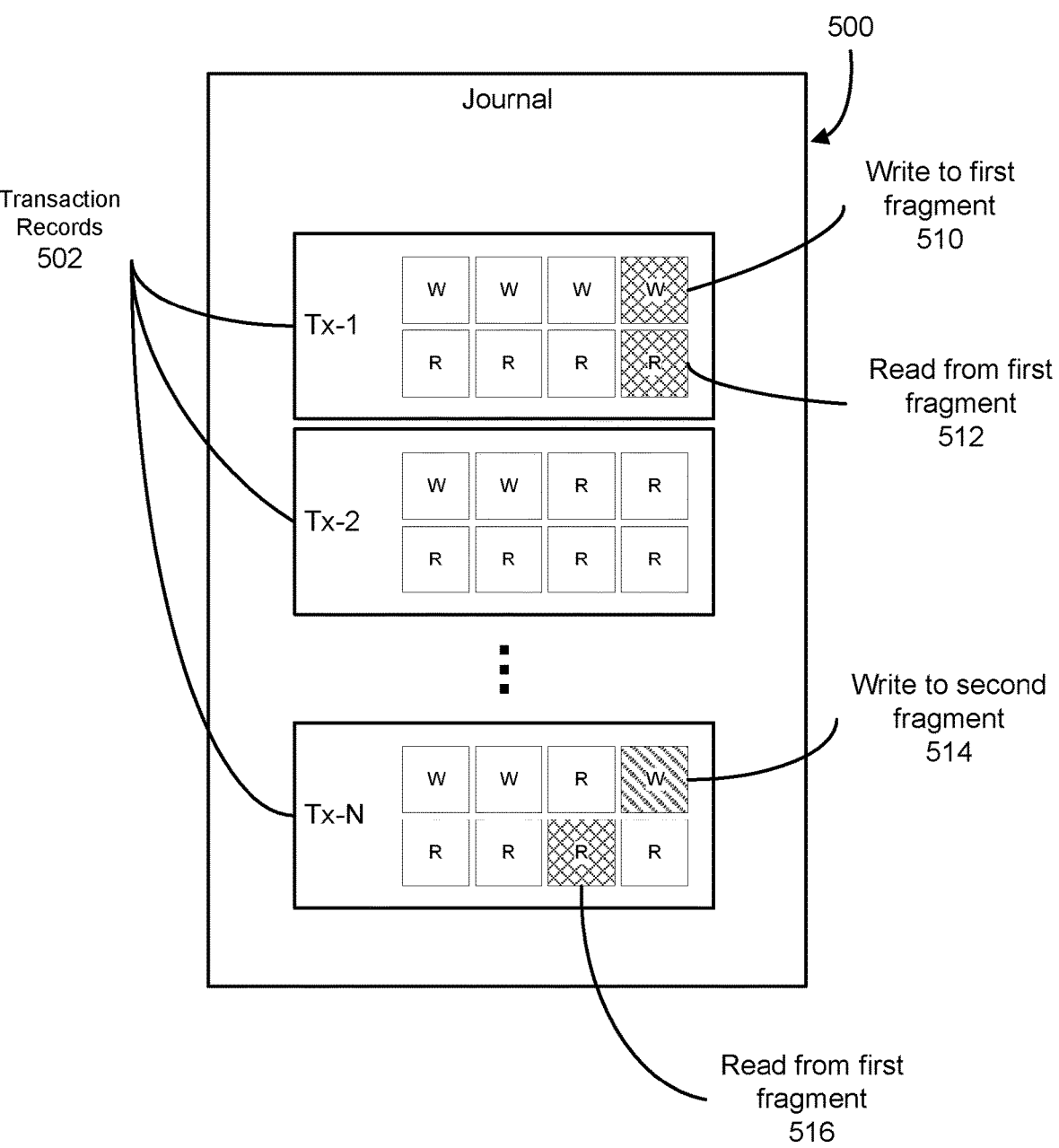
FIG. 5 illustrates a journal, in accordance with an embodiment.

FIG. 5 illustrates a journal, in accordance with an embodiment. In the example of FIG. 5, a journal 500 comprises an immutable, append-only list of transaction records 502. Each of the transaction records 502 comprises data indicative of a read or write operation to a document. There is at least one such chain, or sequence, of transactions for every document represented in the journal 500.

In an embodiment, such as the embodiment depicted in FIG. 5, the transaction records comprise data indicative of a data fragment associated with the read or write operation. For example, in FIG. 5, data is stored indicating that Tx-1 comprises a write to a first fragment 510 and a read from the first fragment 512. Likewise, transaction Tx-N comprises a write to a second fragment 514 and a read from the first fragment 516.

More generally, the journal 500 comprises transaction records 502 which comprise data indicative of changes made both to a logical document and to the underlying storage structure for the journal. FIG. 7 describes aspects of the storage structure.

As depicted in FIG. 5, entries in the journal 500 are stored to reflect an immutable order, in the same sequence as the transactions were applied. For example, Tx-N represents the oldest transaction, Tx-2 the second most recent transaction, and Tx-1 the most recent. The journal 500 thus provides a complete history of the changes made to each document that is represented in the journal 500.

Figure 6:
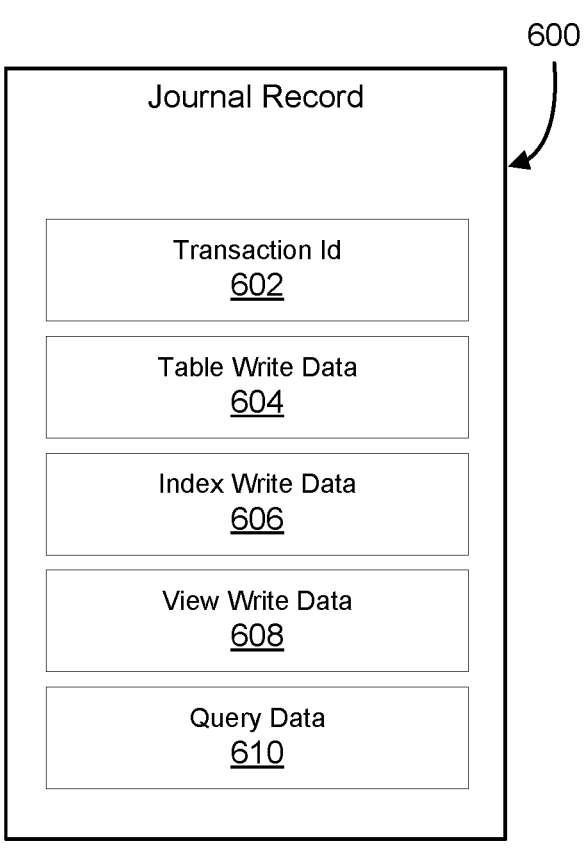
FIG. 6 illustrates aspects of a journal record, in accordance with an embodiment.

FIG. 6 illustrates aspects of a journal record, in accordance with an embodiment. In the example of FIG. 6, a journal record 600 describes various aspects of a transaction. In an embodiment, the journal record might correspond to or be an aspect of one of the transactions Tx-1, Tx-2, . . . . Tx-N depicted in FIG. 5.

As depicted in FIG. 6, a journal record 600 comprises, in an embodiment, a transaction identifier 602. The transaction identifier 602 may be a sequence number, timestamp, cryptographic hash, and so forth. Note that in some embodiments, cryptographic techniques may be used to safeguard the integrity of the journal record 600 and the journal 500, including safeguards which ensure that the ordering of transactions is preserved. Embodiments may use transaction identifiers 602, or other data included in the journal record, as an aspect of these safeguards.

In an embodiment, the journal record 600 comprises table write data 604. The table write data 604 represents modifications made to a table in the corresponding transaction. For example, the table write data 604 might represent changes made to any documents stored in a table as a result of the transaction.

In an embodiment, the journal record 600 comprises index write data 606. The index write data 606 represents modifications made to an index as a consequence of the corresponding transaction. Likewise, in an embodiment, the journal record 600 comprises view write data 608, which represents modification made to a view as a consequence of the transaction.

In an embodiment, the journal record 600 comprises query data 610, representing a SQL command, query language command, or other command on which the transaction was based. This data may be stored for diagnostic purposes.

As described with reference to FIGS. 5 and 6, a journal record comprises, in various embodiments, references to storage fragments affected by a transaction. FIG. 7 illustrates aspects of a storage technique for summary data which utilizes storage fragments, in accordance with an embodiment.

As depicted in the example 700 of FIG. 7, a number of storage structures 720, 722 store fragments 702-706. Each one of the fragments 702-706 resides on a single one of the storage structures 720, 722. In embodiments, each storage structure resides on a single storage node. A storage node comprises a computing device with at least one processor, a memory, and a storage device such as a flash driver, mechanical disk drive, network attached storage, and so forth.

In various embodiments, a given fragment 702 of a summary is a set of records that are managed by the database system 100 as a unit. The summary is fragmented so that every record in a summary is in exactly one fragment. Each fragment contains only record summaries for any one table, index, or view. For example, a first fragment 702 might comprise data for a table summary 710, a second fragment 704 might comprise an index summary 712, and a third fragment might comprise a view summary 714. In some embodiments, each summary corresponds to exactly one fragment, although in other embodiments a summary may be split across fragments. A fragment is sized so that a large number of records can fit into a single fragment, but is not so large that the time required to do a full scan of the fragment is excessive.

A storage structure, such as any of the depicted storage structures 720, 722, comprises a data structure for storing data. Examples of such structures include, but are not limited to, B-trees, hash buckets, and heap trees. Suitable storage structures provide a scan capability, and may also provide filtering, scan-and-filter, and so forth.

In an embodiment, a given storage structure 720 may store multiple fragments. In other embodiments, a given storage structure 722 stores only a single fragment 706. In some embodiments, a given fragment is replicated to multiple storage structures.

Figure 8:
FIG. 8 illustrates aspects of executing a long-running transaction, in accordance with an embodiment.

FIG. 8 illustrates aspects of executing a long-running transaction, in accordance with an embodiment. In the example 800 of FIG. 8 a long-running transaction 802, when executed, creates a view 808.

As used herein, a long-running transaction refers to a transaction whose length is above a threshold. The threshold may vary between cases and embodiments, but in at least some embodiments corresponds to a length of time above which interference from another transaction, such as the depicted short-running transaction 810, is deemed to be likely. Embodiments may, for example, estimate the probability that a transaction is likely to be affected by an intervening transaction, and whether that probability is above a threshold level.

Although FIG. 8 depicts the long-running transaction 802 as creating a view, the scope of the present disclosure encompasses other types of long-running transactions. For example, in cases and embodiments, a long-running transaction might create an index, generate results for a complex query, generate an analytical cube structure, and so forth. Accordingly, it will be appreciated that the use of a view in FIG. 8 is intended to be illustrative, and as such should not be viewed so as to limit the scope of the present disclosure to only those embodiments which conform precisely to the depicted example.

In FIG. 8, the long-running transaction 802 comprises a number of sub-operations 804a-d. A transaction may comprise various sub-operations 804a-d that may be executed independently. For example, if the long-running transaction 802 creates a view 808 over all of a table 806, then the sub-operations 804a-d might each correspond to creating a respective portion of the view 808 over a respective quarter of the table 806. Each of these sub-operations may be independently executed. For example, a sub-operation 804b might be amenable to processing regardless of whether another sub-operation 804a has completed. Further, if any one of these operations were to fail, its execution might be retried without affecting the outcome of any of the other operations.

Note that in FIG. 8, the long-running transaction 802 is seen as operating on a single table 806 to create a view 808. However, the long-running transaction 802 may involve multiple tables or other source data. As such, the use of a single table for illustrative purposes should not be viewed so as to limit the scope of the present disclosure to only those embodiments which conform precisely to the depicted example.

Note that not all long-running transactions are sub-dividable in the manner of the long-running transaction 802 that FIG. 8 depicts. There may be some operations and calculations which, though long-running, cannot be separately executed or retried. However, many types of long-running transactions will conform to this pattern. One such example is the creation of views or indexes. In some embodiments, the query processor may perform lexical and syntactic analysis, and possibly other types of analysis, such as machine learning, to identify transactions that are sub-dividable and to identify the particular sub-divisions for the transaction. One general approach is to identify partitions of the source data and identify corresponding sub-operations for each partition. For example, a query that creates a view based on the data returned from a "select * from T1" statement might comprise two sub-operations, one which creates the first half of the view based on a "select * from T1 where C1<X" statement, and which creates the second half of the view based on a "select * from T1 where C1<=X" statement. It will be appreciated that this example is intended to be illustrative, and as such should not be construed so as to limit the scope of the present disclosure to only those embodiments which conform to the specific example provided.

Also note that although FIG. 8 depicts the sub-operations as distinct elements, there are cases and embodiments in which the sub-operations are not distinct command or operations. For example, for a transaction comprising a set of sub-operations, it may be the case that the serializability of an arbitrary subset of these writes cannot be confirmed. In response, the system may, for example, attempt to reconfirm the serializability of the subset of write operations after a delay period, and thereby complete execution of the associated sub-operations.

Another aspect depicted in FIG. 8 is the potential effect of a short-running transaction 810 on the long-running transaction. As noted herein, a problem that arises when using optimistic concurrency with long-running transactions is that short-running transactions tend to interfere with the ability of a long-running transaction to complete. For example, first assume that the long-running transaction 802 begins execution without locking or with minimal locking. It may then be the case that the depicted short-running transaction 810 completes earlier in time 820 than the long-running transaction 802. At the end of the long-running transaction 802, when validation occurs, it may be the case that the short-running transaction 810 has modified data referenced by the long-running transaction 802 while the long-running transaction was in progress. Accordingly, the long-running transaction is not committed, since it contains inaccurate data due to the effect of the short-running transaction 810.

Likewise, assume for the purpose of example that the long-running transaction 802 comprises sub-operations 804a-d. If each sub-operation is independently validated, the first sub-operation 804a might be executed with no locking or with minimal locking, but complete successfully since the data it relies on was not modified during its execution. The second sub-operation 804b, however, might fail due to interference from the short-running transaction. Rather than fail the entire long-running transaction 802, however, the database system 100 continues by executing the remaining sub-operations 804c-d, and then re-executing the previously executed sub-transaction 804c. If the sub-operation 804c succeeds, then the entire long-running transaction 802 can be committed.

Figure 9:
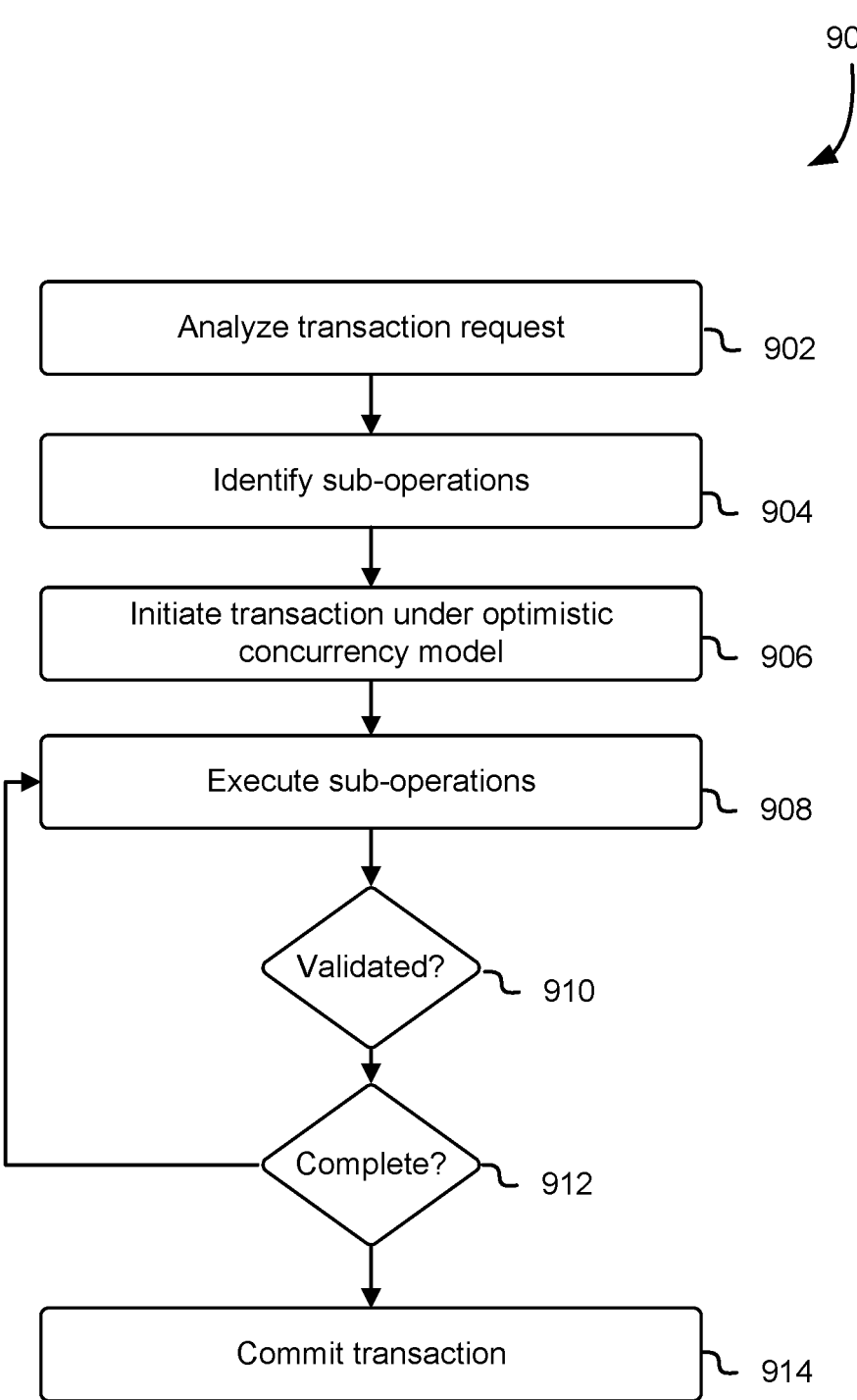
FIG. 9 illustrates an example process for executing a long-running transaction using an optimistic concurrency model.

The example 800 of FIG. 8 may be further understood in view of FIG. 9, which illustrates an example process 900 for executing a long-running transaction using an optimistic concurrency model. Although FIG. 9 is depicted as a sequence of steps, the depicted sequence should not be construed as limiting the scope of the present disclosure to only those embodiments conforming to the depicted order. For example, unless otherwise indicated or clear from context (e.g., when the output of one step is used as input into another), at least some of the depicted steps may be reordered or performed in parallel.

At 902, the query processor analyzes a received request to perform a transaction, to determine if it appears likely to be a long-running transaction and to determine if the transaction is amenable to subdivision. Note that in some cases, the initiator of the transaction may make this determination, for example by specifying via an application programming interface call that the submitted transaction is long-running and requesting that it be subdivided. In some instances, the sub-transactions are indicated via application programming interface, or a programming interface is used to indicate that the transaction comprises operations that can be retried.

Alternatively, the system may defer determining whether the transaction comprises operations that can be independently re-executed, re-applied, or re-validated. This can be deferred until an operation fails. At that time, the system may respond by identifying the operation that failed and determining whether it may be retried without adversely affecting the resulting data state.

At 904, the query processor may identify the sub-operations of which the long-running transaction is comprised. This may, in some embodiments, comprise identifying a plurality of operations to perform in order to complete the long-running transaction. It may further comprise, in some instances, determining which sub-operations can be retried without adverse impact on the correctness of the resulting data state.

At 906, the long-running transaction is initiated under an optimistic concurrency model. Under an optimistic concurrency model, no locks are acquired on the data that is to be updated, at least during the time that data for the transaction is read and write operations are prepared for application to the underlying data store. Instead, data for the transaction is read, processed, and prepared for application under the optimistic assumption that the serializability of the transaction will not be compromised by an intervening transaction. Locks may be acquired during the stage of the process in which writes are applied, which is relatively brief, but are not generally acquired during the earlier stages, which are relatively long. The model is described as optimistic because it may be presumed (though sometimes incorrectly) that the data will not be modified during the transaction. This presumption is less likely to hold true during long-running transactions. Nevertheless, the optimistic concurrency model provides technical advantages to the ledger-based database, since reducing or eliminating locking improves efficiency. For example, avoiding locks may reduce round-trips to the storage nodes to which the writes are applied. In an embodiment, locks are not acquired on the data during any of the initial stages of the transaction. During the commit phase, when the writes are to be applied, the storage nodes determine the serializability of the long-running transaction and fail the commit if serializability cannot be confirmed.

Steps 908 to 912 depict executing sub-operations and validating the sub-operations until they have all been completed. The validation aspect of this step may comprise attempting to confirm the serializability of the sub-operation, in the manner described above.

In various embodiments, a sub-operation that fails validation is re-executed, re-applied, or re-validated after a delay period. The delay period may correspond to the time taken to execute some or all of the sub-operations that remain pending. A sub-operation may be described as pending because it has either never executed, has executed but failed validation, or is executing but has been suspended for a delay period following a failed validation. The delay period may also be another value, such as a length of time intervening transactions are pending or predicted to remain pending, or to a value determined experimentally.

In various embodiments, each sub-operation is validated independently. If each sub-operation is successfully validated, the transaction may be committed. If a sub-operation fails validation, its execution can be completed by and attempt to re-execute, re-apply, or re-validate the sub-operation after the delay period. For example, in an embodiment, it may be the case that when a sub-operation fails validation, the system pauses execution of the sub-operation and then attempts to retry the validation at a later time. The system may take various corrective actions in conjunction with the retry, such as re-reading relevant values. In another example, an embodiment my re-execute the sub-operation in its entirety.

In various embodiments, the sub-operations are validated in a validation phase, and any sub-operations which fail during that phase are re-executed, or their execution is suspended for a delay period and then re-validated.

Note that re-executing a sub-operation may involve, in various embodiments, re-reading any data affected by an intervening transaction, so that the updated data can be incorporated into the sub-operation. The serializability of the sub-operation can then be re-determined, and the sub-operation can be committed if its serializability is confirmed.

In some cases and embodiments, a sub-operation may be sub-divided, so that any failed portions can be selectively re-executed.

In more general terms, embodiments may end steps 908-912 when each sub-operation has successfully completed and the current state of the larger transaction is consistent.

In embodiments, a gatekeeper module facilitates commitment of the sub-transactions and detection of an inconsistent state. In embodiments, a gatekeeper module is a component of a transaction coordinator, such as the transaction coordinator 104 depicted in FIG. 1. Alternatively, the gatekeeper module is a component of the storage subsystem, such as the storage system 106 depicted in FIG. 1.

In embodiments, each table, index, or view is associated with a gatekeeper module, which may also be described as a gateway module. FIG. 1 depicts an example of a gatekeeper module. A gatekeeper module may confirm the serializability of a transaction or sub-operation. For example, a gatekeeper is able to tell if data used by a sub-operation has been modified in the recent past, e.g., during the execution period of the long-running transaction. The gatekeeper module is also involved in the process of writing to the underlying data storage of the table, index, or view. As such, the gatekeeper module can detect whether or not a conflicting write has occurred, and commit the data for the sub-operation or transaction if there is no such conflict.

If there is a conflict, the gatekeeper can provide information about which parts of the transaction or sub-operation were affected.

Step 914 depicts committing the transaction, once each sub-operation has completed. In various embodiments, the gatekeeper modules can inform the transaction coordinator and query processor if there is a new validation failure during the final commit phase. Otherwise, the long-running transaction completes.

In cases where the long-running transaction is directed to the creation of a view, committing the long-running transaction can comprise finalizing view summary data, so that the view summary data is available for use. For example, the view may be queried once the long-running transaction completes. Likewise, where the long-running transaction is directed to the creation of an index, embodiments may finalize and make available the corresponding index summary data, so that queries are able to leverage the new index.

Figure 10:
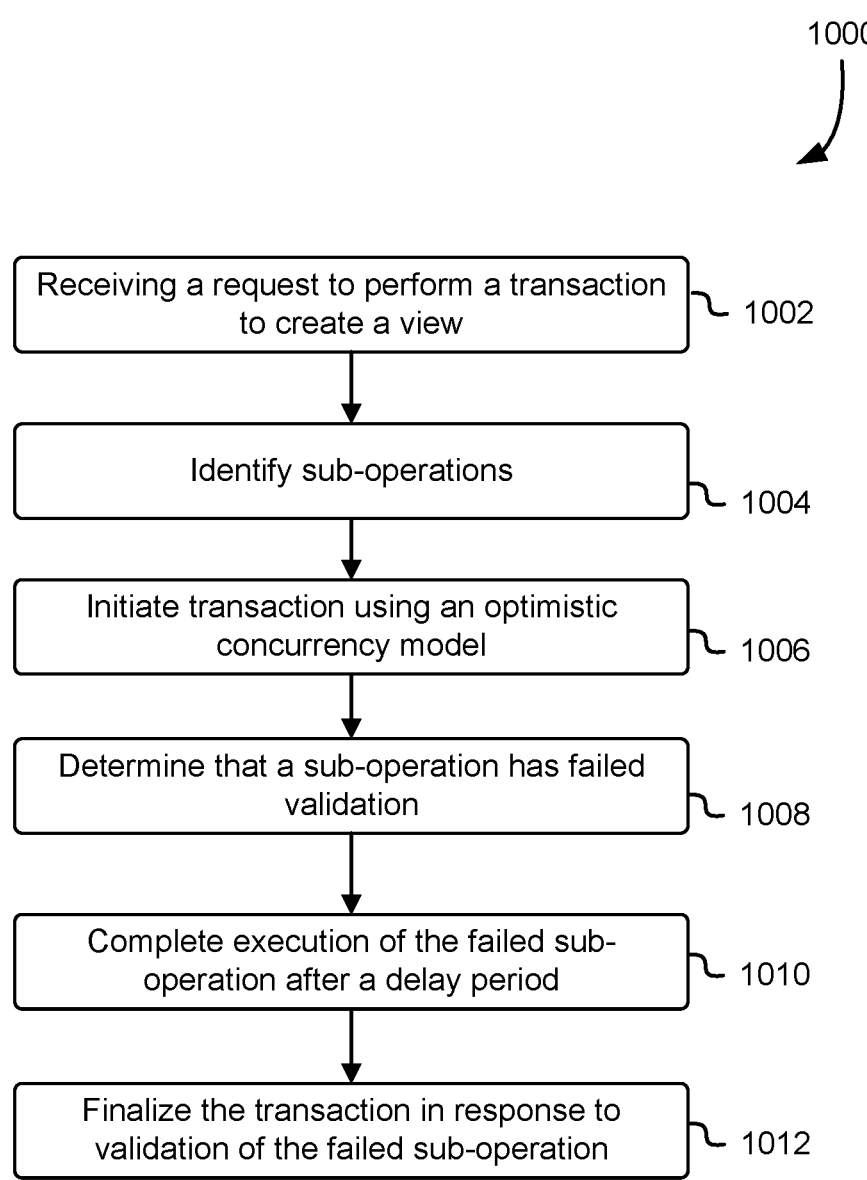
FIG. 10 illustrates aspects of an example process for executing a long-running transaction.

FIG. 10 illustrates aspects of an example process for executing a long-running transaction. Although the example process 1000 of FIG. 10 is depicted as a sequence of steps, the depicted sequence should not be construed as limiting the scope of the present disclosure to only those embodiments conforming to the depicted order. For example, unless otherwise indicated or clear from context (e.g., when the output of one step is used as input into another), at least some of the depicted steps may be reordered or performed in parallel.

At 1002, the database system 100 receives a request to perform a transaction which, when executed, is to create a view. The request is received, in embodiments, by a query processor of the database system 100. In embodiments, the transaction is directed to creating and storing view summary data in a summary data structure, such as the summary 204 depicted in FIG. 2.

At 1004, the database system may determine that the transaction comprise a plurality of sub-operations that can be independently retried in the event that there is a failure. This step also may be performed, in various embodiments, by a query processor, such as the query processor depicted in FIG. 1. Aspects of step 1004 related to subdividing the transaction are discussed above regarding FIG. 9. Note that, in various embodiments, this determination may be performed when and if a failure occurs. While some embodiments may sub-divide the long-running transaction as an initial, preparatory step, other embodiments may determine whether a long-running transaction comprises a sub-operation that can be retried when a failure occurs. For example, when a failure occurs, the transaction can be analyzed to determine whether it comprises re-executable operations.

At 1006, the database system initiates performing of the transaction using an optimistic concurrency model. As explained above, performing the transaction in accordance with optimistic concurrency may involve taking few or no locks until the final commit stage of the transaction, and in particular avoiding the acquisition of locks during the reading and processing phases of the transaction. In some embodiments, the serializability of the transaction is determined by a storage system, such as the storage system 106 depicted in FIG. 1, during the commit phase, and the writes of the transaction are applied without acquiring locks, or with minimal lock acquisition.

At 1008, the database system determines that one of the sub-operations has failed a validation step. Generally speaking, the validation relates to determination whether or not another transaction has modified the data read by the sub-operation before changes made by a sub-operation had a chance to commit.

Step 1010 depicts completing execution of the failed sub-operation after a delay period. Generally speaking, this involves re-executing certain phases of the sub-operation, including one or more of the reading, processing, and validation phases of the sub-operation. For example, execution of the sub-operation may pause until a delay period has elapsed, and the system may then re-attempt to confirm the serializability of the transaction. Various corrective actions, such as re-reading The serializability of the sub-transaction can be determined by a gatekeeper module or other aspect of the storage system, and the sub-transaction can be committed if serializability is confirmed.

In embodiments, a gateway module acts to determine whether a sub-transaction is able to commit. The gateway module may correspond to the table, view, or index that is the subject of the sub-operation.

Step 1012 depicts finalizing the transaction once all of the sub-operations have successfully completed, including any sub-operations which initially failed validation and were re-executed, re-applied, or re-validated. Finalizing the transaction may comprise making the view or other results of the long-running transaction available for use. In embodiments, the sub-operations are part of a nested transaction, and can thus be rolled-back if the long-running transaction ultimately fails, or committed en masse once each sub-operation has successfully completed. Also note that finalization of the long-running transaction, in some embodiments, can be optimized based on the type of long-running transaction that is executing. For example, regarding a long-running transaction that creates a view, the sub-operations might be committed independently, without nesting the sub-operations in the long-running transaction.

Figure 11:
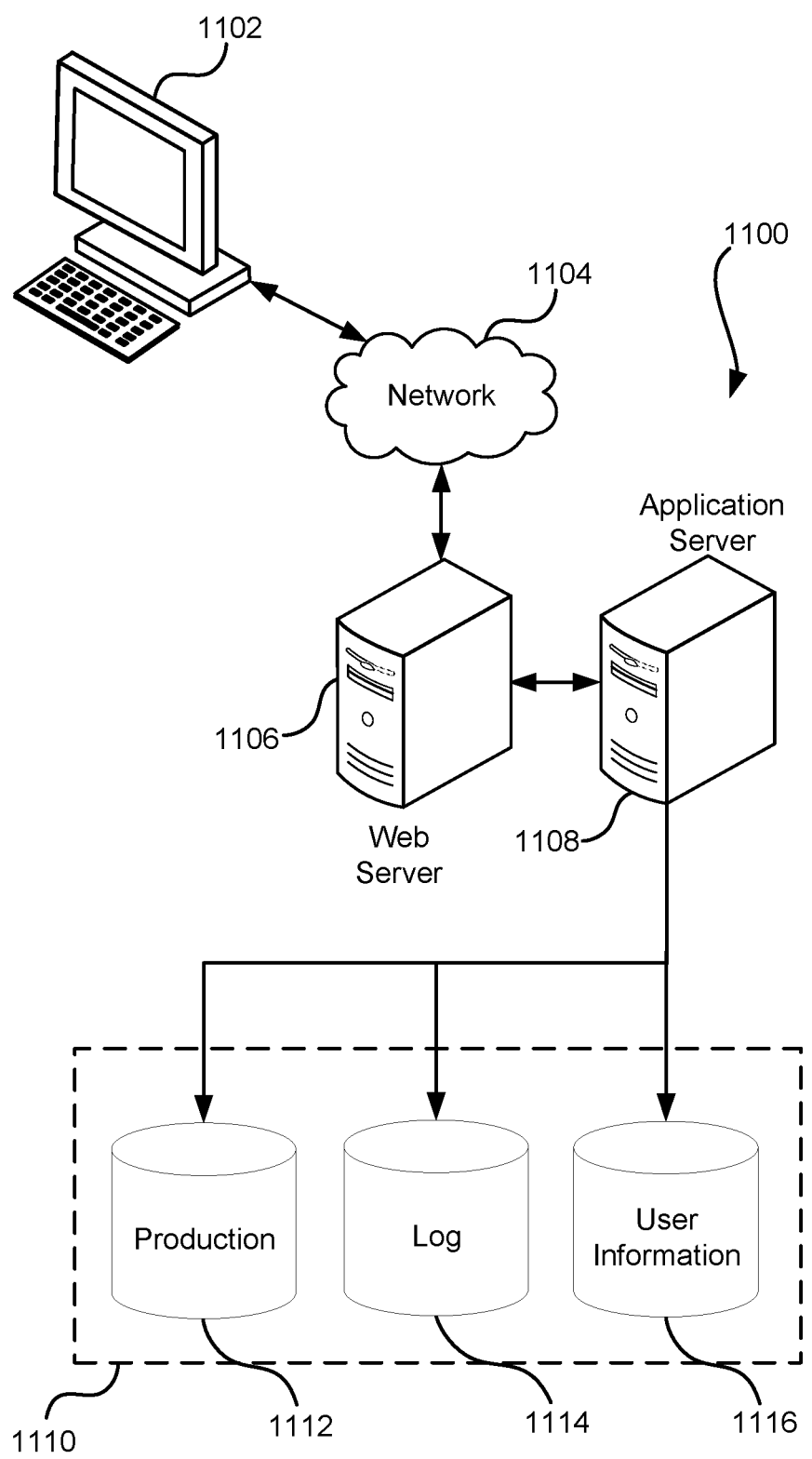
FIG. 11 illustrates a system in which various embodiments can be implemented.

FIG. 11 illustrates aspects of an example system 1100 for implementing aspects in accordance with an embodiment. As will be appreciated, although a web-based system is used for purposes of explanation, different systems may be used, as appropriate, to implement various embodiments. In an embodiment, the system includes an electronic client device 1102, which includes any appropriate device operable to send and/or receive requests, messages, or information over an appropriate network 1104 and convey information back to a user of the device. Examples of such client devices include personal computers, cellular or other mobile phones, handheld messaging devices, laptop computers, tablet computers, set-top boxes, personal data assistants, embedded computer systems, electronic book readers, and the like. In an embodiment, the network includes any appropriate network, including an intranet, the Internet, a cellular network, a local area network, a satellite network or any other such network and/or combination thereof, and components used for such a system depend at least in part upon the type of network and/or system selected. Many protocols and components for communicating via such a network are well known and will not be discussed herein in detail. In an embodiment, communication over the network is enabled by wired and/or wireless connections and combinations thereof. In an embodiment, the network includes the Internet and/or other publicly addressable communications network, as the system includes a web server 1106 for receiving requests and serving content in response thereto, although for other networks an alternative device serving a similar purpose could be used as would be apparent to one of ordinary skill in the art.

In an embodiment, the illustrative system includes at least one application server 1108 and a data store 1110, and it should be understood that there can be several application servers, layers or other elements, processes or components, which may be chained or otherwise configured, which can interact to perform tasks such as obtaining data from an appropriate data store. Servers, in an embodiment, are implemented as hardware devices, virtual computer systems, programming modules being executed on a computer system, and/or other devices configured with hardware and/or software to receive and respond to communications (e.g., web service application programming interface (API) requests) over a network. As used herein, unless otherwise stated or clear from context, the term "data store" refers to any device or combination of devices capable of storing, accessing and retrieving data, which may include any combination and number of data servers, databases, data storage devices and data storage media, in any standard, distributed, virtual or clustered system. Data stores, in an embodiment, communicate with block-level and/or object-level interfaces. The application server can include any appropriate hardware, software and firmware for integrating with the data store as needed to execute aspects of one or more applications for the client device, handling some or all of the data access and business logic for an application.

In an embodiment, the application server provides access control services in cooperation with the data store and generates content including but not limited to text, graphics, audio, video and/or other content that is provided to a user associated with the client device by the web server in the form of HyperText Markup Language ("HTML"), Extensible Markup Language ("XML"), JavaScript, Cascading Style Sheets ("CSS"), JavaScript Object Notation (JSON), and/or another appropriate client-side or other structured language. Content transferred to a client device, in an embodiment, is processed by the client device to provide the content in one or more forms including but not limited to forms that are perceptible to the user audibly, visually and/or through other senses. The handling of all requests and responses, as well as the delivery of content between the client device 1102 and the application server 1108, in an embodiment, is handled by the web server using PHP: Hypertext Preprocessor ("PHP"), Python, Ruby, Perl, Java, HTML, XML, JSON, and/or another appropriate server-side structured language in this example. In an embodiment, operations described herein as being performed by a single device are performed collectively by multiple devices that form a distributed and/or virtual system.

The data store 1110, in an embodiment, includes several separate data tables, databases, data documents, dynamic data storage schemes and/or other data storage mechanisms and media for storing data relating to a particular aspect of the present disclosure. In an embodiment, the data store illustrated includes mechanisms for storing production data 1112 and user information 1116, which are used to serve content for the production side. The data store also is shown to include a mechanism for storing log data 1114, which is used, in an embodiment, for reporting, computing resource management, analysis or other such purposes. In an embodiment, other aspects such as page image information and access rights information (e.g., access control policies or other encodings of permissions) are stored in the data store in any of the above listed mechanisms as appropriate or in additional mechanisms in the data store 1110.

The data store 1110, in an embodiment, is operable, through logic associated therewith, to receive instructions from the application server 1108 and obtain, update or otherwise process data in response thereto, and the application server 1108 provides static, dynamic, or a combination of static and dynamic data in response to the received instructions. In an embodiment, dynamic data, such as data used in web logs (blogs), shopping applications, news services, and other such applications, are generated by server-side structured languages as described herein or are provided by a content management system ("CMS") operating on or under the control of the application server. In an embodiment, a user, through a device operated by the user, submits a search request for a certain type of item. In this example, the data store accesses the user information to verify the identity of the user, accesses the catalog detail information to obtain information about items of that type, and returns the information to the user, such as in a results listing on a web page that the user views via a browser on the user device 1102. Continuing with example, information for a particular item of interest is viewed in a dedicated page or window of the browser. It should be noted, however, that embodiments of the present disclosure are not necessarily limited to the context of web pages but are more generally applicable to processing requests in general, where the requests are not necessarily requests for content. Example requests include requests to manage and/or interact with computing resources hosted by the system 1100 and/or another system, such as for launching, terminating, deleting, modifying, reading, and/or otherwise accessing such computing resources.

In an embodiment, each server typically includes an operating system that provides executable program instructions for the general administration and operation of that server and includes a computer-readable storage medium (e.g., a hard disk, random access memory, read only memory, etc.) storing instructions that, if executed by a processor of the server, cause or otherwise allow the server to perform its intended functions (e.g., the functions are performed as a result of one or more processors of the server executing instructions stored on a computer-readable storage medium).

The system 1100, in an embodiment, is a distributed and/or virtual computing system utilizing several computer systems and components that are interconnected via communication links (e.g., transmission control protocol (TCP) connections and/or transport layer security (TLS) or other cryptographically protected communication sessions), using one or more computer networks or direct connections. However, it will be appreciated by those of ordinary skill in the art that such a system could operate in a system having fewer or a greater number of components than are illustrated in FIG. 11. Thus, the depiction of the system 1100 in FIG. 11 should be taken as being illustrative in nature and not limiting to the scope of the disclosure.

The various embodiments further can be implemented in a wide variety of operating environments, which in some cases can include one or more user computers, computing devices or processing devices which can be used to operate any of a number of applications. In an embodiment, user or client devices include any of a number of computers, such as desktop, laptop or tablet computers running a standard operating system, as well as cellular (mobile), wireless and handheld devices running mobile software and capable of supporting a number of networking and messaging protocols, and such a system also includes a number of workstations running any of a variety of commercially available operating systems and other known applications for purposes such as development and database management. In an embodiment, these devices also include other electronic devices, such as dummy terminals, thin-clients, gaming systems and other devices capable of communicating via a network, and virtual devices such as virtual machines, hypervisors, and software containers utilizing operating-system level virtualization and other virtual devices or non-virtual devices supporting virtualization capable of communicating via a network.

In an embodiment, a system utilizes at least one network that would be familiar to those skilled in the art for supporting communications using any of a variety of commercially available protocols, such as Transmission Control Protocol/Internet Protocol ("TCP/IP"), User Datagram Protocol ("UDP"), protocols operating in various layers of the Open System Interconnection ("OSI") model, File Transfer Protocol ("FTP"), Universal Plug and Play ("UpnP"), Network File System ("NFS"), Common Internet File System ("CIFS") and other protocols. The network, in an embodiment, is a local area network, a wide-area network, a virtual private network, the Internet, an intranet, an extranet, a public switched telephone network, an infrared network, a wireless network, a satellite network, and any combination thereof. In an embodiment, a connection-oriented protocol is used to communicate between network endpoints such that the connection-oriented protocol (sometimes called a connection-based protocol) is capable of transmitting data in an ordered stream. In an embodiment, a connection-oriented protocol can be reliable or unreliable. For example, the TCP protocol is a reliable connection-oriented protocol. Asynchronous Transfer Mode ("ATM") and Frame Relay are unreliable connection-oriented protocols. Connection-oriented protocols are in contrast to packet-oriented protocols such as UDP that transmit packets without a guaranteed ordering.

In an embodiment, the system utilizes a web server that runs one or more of a variety of server or mid-tier applications, including Hypertext Transfer Protocol ("HTTP") servers, FTP servers, Common Gateway Interface ("CGI") servers, data servers, Java servers, Apache servers, and business application servers. In an embodiment, the one or more servers are also capable of executing programs or scripts in response to requests from user devices, such as by executing one or more web applications that are implemented as one or more scripts or programs written in any programming language, such as Java®, C, C# or C++, or any scripting language, such as Ruby, PHP, Perl, Python or TCL, as well as combinations thereof. In an embodiment, the one or more servers also include database servers, including without limitation those commercially available from Oracle®, Microsoft®, Sybase®, and IBM® as well as open-source servers such as MySQL, Postgres, SQLite, MongoDB, and any other server capable of storing, retrieving, and accessing structured or unstructured data. In an embodiment, a database server includes table-based servers, document-based servers, unstructured servers, relational servers, non-relational servers, or combinations of these and/or other database servers.

In an embodiment, the system includes a variety of data stores and other memory and storage media as discussed above which can reside in a variety of locations, such as on a storage medium local to (and/or resident in) one or more of the computers or remote from any or all of the computers across the network. In an embodiment, the information resides in a storage-area network ("SAN") familiar to those skilled in the art and, similarly, any necessary files for performing the functions attributed to the computers, servers or other network devices are stored locally and/or remotely, as appropriate. In an embodiment where a system includes computerized devices, each such device can include hardware elements that are electrically coupled via a bus, the elements including, for example, at least one central processing unit ("CPU" or "processor"), at least one input device (e.g., a mouse, keyboard, controller, touch screen, or keypad), at least one output device (e.g., a display device, printer, or speaker), at least one storage device such as disk drives, optical storage devices, and solid-state storage devices such as random access memory ("RAM") or read-only memory ("ROM"), as well as removable media devices, memory cards, flash cards, etc., and various combinations thereof.

In an embodiment, such a device also includes a computer-readable storage media reader, a communications device (e.g., a modem, a network card (wireless or wired), an infrared communication device, etc.), and working memory as described above where the computer-readable storage media reader is connected with, or configured to receive, a computer-readable storage medium, representing remote, local, fixed, and/or removable storage devices as well as storage media for temporarily and/or more permanently containing, storing, transmitting, and retrieving computer-readable information. In an embodiment, the system and various devices also typically include a number of software applications, modules, services, or other elements located within at least one working memory device, including an operating system and application programs, such as a client application or web browser. In an embodiment, customized hardware is used and/or particular elements are implemented in hardware, software (including portable software, such as applets), or both. In an embodiment, connections to other computing devices such as network input/output devices are employed.

In an embodiment, storage media and computer readable media for containing code, or portions of code, include any appropriate media known or used in the art, including storage media and communication media, such as but not limited to volatile and non-volatile, removable and non-removable media implemented in any method or technology for storage and/or transmission of information such as computer readable instructions, data structures, program modules or other data, including RAM, ROM, Electrically Erasable Programmable Read-Only Memory ("EEPROM"), flash memory or other memory technology, Compact Disc Read-Only Memory ("CD-ROM"), digital versatile disk (DVD) or other optical storage, magnetic cassettes, magnetic tape, magnetic disk storage or other magnetic storage devices or any other medium which can be used to store the desired information and which can be accessed by the system device. Based on the disclosure and teachings provided herein, a person of ordinary skill in the art will appreciate other ways and/or methods to implement the various embodiments.

The specification and drawings are, accordingly, to be regarded in an illustrative rather than a restrictive sense. It will, however, be evident that various modifications and changes may be made thereunto without departing from the broader spirit and scope of the invention as set forth in the claims.

Other variations are within the spirit of the present disclosure. Thus, while the disclosed techniques are susceptible to various modifications and alternative constructions, certain illustrated embodiments thereof are shown in the drawings and have been described above in detail. It should be understood, however, that there is no intention to limit the invention to the specific form or forms disclosed but, on the contrary, the intention is to cover all modifications, alternative constructions, and equivalents falling within the spirit and scope of the invention, as defined in the appended claims.

The use of the terms "a" and "an" and "the" and similar referents in the context of describing the disclosed embodiments (especially in the context of the following claims) are to be construed to cover both the singular and the plural, unless otherwise indicated herein or clearly contradicted by context. Similarly, use of the term "or" is to be construed to mean "and/or" unless contradicted explicitly or by context. The terms "comprising," "having," "including," and "containing" are to be construed as open-ended terms (i.e., meaning "including, but not limited to,") unless otherwise noted. The term "connected," when unmodified and referring to physical connections, is to be construed as partly or wholly contained within, attached to, or joined together, even if there is something intervening. Recitation of ranges of values herein are merely intended to serve as a shorthand method of referring individually to each separate value falling within the range, unless otherwise indicated herein, and each separate value is incorporated into the specification as if it were individually recited herein. The use of the term "set" (e.g., "a set of items") or "subset" unless otherwise noted or contradicted by context, is to be construed as a nonempty collection comprising one or more members. Further, unless otherwise noted or contradicted by context, the term "subset" of a corresponding set does not necessarily denote a proper subset of the corresponding set, but the subset and the corresponding set may be equal. The use of the phrase "based on," unless otherwise explicitly stated or clear from context, means "based at least in part on" and is not limited to "based solely on."

Conjunctive language, such as phrases of the form "at least one of A, B, and C," or "at least one of A, B and C," (i.e., the same phrase with or without the Oxford comma) unless specifically stated otherwise or otherwise clearly contradicted by context, is otherwise understood within the context as used in general to present that an item, term, etc., may be either A or B or C, any nonempty subset of the set of A and B and C, or any set not contradicted by context or otherwise excluded that contains at least one A, at least one B, or at least one C. For instance, in the illustrative example of a set having three members, the conjunctive phrases "at least one of A, B, and C" and "at least one of A, B and C" refer to any of the following sets: {A}, {B}, {C}, {A, B}, {A, C}, {B, C}, {A, B, C}, and, if not contradicted explicitly or by context, any set having {A}, {B}, and/or {C} as a subset (e.g., sets with multiple "A"). Thus, such conjunctive language is not generally intended to imply that certain embodiments require at least one of A, at least one of B and at least one of C each to be present. Similarly, phrases such as "at least one of A, B, or C" and "at least one of A, B or C" refer to the same as "at least one of A, B, and C" and "at least one of A, B and C" refer to any of the following sets: {A}, {B}, {C}, {A, B}, {A, C}, {B, C}, {A, B, C}, unless differing meaning is explicitly stated or clear from context. In addition, unless otherwise noted or contradicted by context, the term "plurality" indicates a state of being plural (e.g., "a plurality of items" indicates multiple items). The number of items in a plurality is at least two but can be more when so indicated either explicitly or by context.

Operations of processes described herein can be performed in any suitable order unless otherwise indicated herein or otherwise clearly contradicted by context. In an embodiment, a process such as those processes described herein (or variations and/or combinations thereof) is performed under the control of one or more computer systems configured with executable instructions and is implemented as code (e.g., executable instructions, one or more computer programs or one or more applications) executing collectively on one or more processors, by hardware or combinations thereof. In an embodiment, the code is stored on a computer-readable storage medium, for example, in the form of a computer program comprising a plurality of instructions executable by one or more processors. In an embodiment, a computer-readable storage medium is a non-transitory computer-readable storage medium that excludes transitory signals (e.g., a propagating transient electric or electromagnetic transmission) but includes non-transitory data storage circuitry (e.g., buffers, cache, and queues) within transceivers of transitory signals. In an embodiment, code (e.g., executable code or source code) is stored on a set of one or more non-transitory computer-readable storage media having stored thereon executable instructions that, when executed (i.e., as a result of being executed) by one or more processors of a computer system, cause the computer system to perform operations described herein. The set of non-transitory computer-readable storage media, in an embodiment, comprises multiple non-transitory computer-readable storage media, and one or more of individual non-transitory storage media of the multiple non-transitory computer-readable storage media lack all of the code while the multiple non-transitory computer-readable storage media collectively store all of the code. In an embodiment, the executable instructions are executed such that different instructions are executed by different processors—for example, in an embodiment, a non-transitory computer-readable storage medium stores instructions and a main CPU executes some of the instructions while a graphics processor unit executes other instructions. In another embodiment, different components of a computer system have separate processors and different processors execute different subsets of the instructions.

Accordingly, in an embodiment, computer systems are configured to implement one or more services that singly or collectively perform operations of processes described herein, and such computer systems are configured with applicable hardware and/or software that enable the performance of the operations. Further, a computer system, in an embodiment of the present disclosure, is a single device and, in another embodiment, is a distributed computer system comprising multiple devices that operate differently such that the distributed computer system performs the operations described herein and such that a single device does not perform all operations.

The use of any and all examples or exemplary language (e.g., "such as") provided herein is intended merely to better illuminate embodiments of the invention and does not pose a limitation on the scope of the invention unless otherwise claimed. No language in the specification should be construed as indicating any non-claimed element as essential to the practice of the invention.

Embodiments of this disclosure are described herein, including the best mode known to the inventors for carrying out the invention. Variations of those embodiments may become apparent to those of ordinary skill in the art upon reading the foregoing description. The inventors expect skilled artisans to employ such variations as appropriate, and the inventors intend for embodiments of the present disclosure to be practiced otherwise than as specifically described herein. Accordingly, the scope of the present disclosure includes all modifications and equivalents of the subject matter recited in the claims appended hereto as permitted by applicable law. Moreover, any combination of the above-described elements in all possible variations thereof is encompassed by the scope of the present disclosure unless otherwise indicated herein or otherwise clearly contradicted by context.

All references including publications, patent applications, and patents cited herein are hereby incorporated by reference to the same extent as if each reference were individually and specifically indicated to be incorporated by reference and were set forth in its entirety herein.

What is claimed is:

1. A system, comprising: at least one processor; and at least one memory comprising computer-executable instructions that, in response to being executed by the at least one processor, cause the system to at least: receive a request to create a view, the view created by execution of a transaction comprising a plurality of sub-operations that compute the view, the transaction having a length of time that is above a threshold associated with a probability that the transaction will be affected by an intervening transaction;

initiate the transaction using an optimistic concurrency model that confirms serializability of the transaction prior to committing of the transaction and based at least in part on confirming that an outcome of the transaction has not been affected by an intervening transaction;

process a first sub-operation of the plurality of sub-operations to compute at least a first portion of the view;

responsive to a determination that a second sub-operation, of the plurality of sub-operations, has failed validation based at least in part on an intervening change to data referenced by the second sub-operation occurring before the second sub-operation has committed:

confirm the serializability of the second sub-operation to determine that the second sub-operation can be committed, and retry execution of the second sub-operation after a delay period;

finalize the transaction responsive to successful validation of the first sub-operation and the retried second sub-operation that computes at least a second portion of the view;

commit the transaction responsive to completion of each of the plurality of sub-operations including the retried second sub-operation after initial failed validation due to an error;

and determine a probability that an additional transaction will be affected by an intervening transaction and that the probability is above a threshold level, and in response to determining that the probability is above the threshold level, initiating the additional transaction using the optimistic concurrency model that confirms serializability of the additional transaction prior to committing of the additional transaction.

2. The system of claim 1, wherein the at least one memory comprises further computer-executable instructions that, in response to being executed by the at least one processor, cause the system to at least determine that the sub-operation has failed validation based at least in part on an intervening change to data referenced by the sub-operation.

3. The system of claim 1, wherein the at least one memory comprises further computer-executable instructions that, in response to being executed by the at least one processor, cause the system to at least determine that a probability of a conflict with an additional transaction is above a threshold amount.

4. The system of claim 1, wherein the transaction is committed in response to completion of each of the plurality of sub-operations.

5. The system of claim 1, wherein the at least one memory comprises further computer-executable instructions that, in response to being executed by the at least one processor, cause the system to at least re-attempt to validate the sub-operation.

6. A computer-implemented method, comprising: receiving a request to perform a transaction determined to be long-running based at least in part on the transaction having a length of time that is above a threshold associated with a probability that the transaction will be affected by an intervening transaction, the transaction comprising a plurality of sub-operations that when performed compute the transaction;

determining that the probability that the transaction will be affected by an intervening transaction is above a threshold level;

initiating execution of the plurality of sub-operations with a model that confirms serializability of the transaction prior to committing of the transaction and based at least in part on confirming that an outcome of the transaction has not been affected by an intervening transaction;

responsive to determining that a sub-operation of the plurality of sub-operations failed, confirming the serializability of the sub-operation to determine if the sub-operation can be committed;

after a delay period, retrying execution of the sub-operation, of the plurality of sub-operations, in response to the determining that the sub-operation failed validation based at least in part on an intervening change to data referenced by the sub-operation occurring before the sub-operation has committed, the execution of the sub-operation computing a first portion of the transaction;

finalizing the transaction responsive to successful validation of the retried sub-operation, wherein the transaction is finalized in response to completion of each of the plurality of sub-operations including the retried sub-operation after initial failed validation;

committing the transaction responsive to completion of each of the plurality of sub-operations including the retried second sub-operation after initial failed validation due to an error;

and responsive to determining that a probability of an additional transaction being affected by an intervening transaction is above a threshold level, initiating the additional transaction using the optimistic concurrency model that confirms serializability of the additional transaction prior to committing of the additional transaction.

7. The computer-implemented method of claim 6, further comprising determining that the sub-operation has failed validation based at least in part on an intervening change to data referenced by the sub-operation.

8. The computer-implemented method of claim 6, wherein execution of the sub-operation is suspended during the delay period and completing execution of the sub-operation comprises attempting to re-validate the sub-operation.

9. The computer-implemented method of The computer-implemented method of wherein the transaction is committed based at least in part on completion of each of the plurality of sub-operations.

10. The computer-implemented method of claim 6, further comprising determining that the sub-operation can be retried.

11. The computer-implemented method of claim 6, wherein the request to perform the transaction corresponds to a request to compute a view summary.

12. The computer-implemented method of claim 11, wherein the sub-operation, when performed, computes a portion of the view summary.

13. The computer-implemented method of claim 6, wherein the plurality of sub-operations each operate on a logical partition of a table.

14. A non-transitory computer-readable storage medium having stored thereon executable instructions that, as a result of being executed by one or more processors of a computer system, cause the computer system to at least:

determine a probability that a transaction will be affected by an intervening transaction and that the probability is above a threshold level;

determine that the transaction is dividable into a plurality of sub-operations usable to complete at least a portion of the transaction, the transaction associated with a length of time that is above a time threshold associated with the probability that the transaction will be affected by the intervening transaction;

initiate execution of a transaction comprising the plurality of sub-operations with a method that confirms serializability of the transaction based at least in part on confirming that an outcome of the transaction has not been affected by an intervening transaction;

in response to determining that a sub-operation of the plurality of sub-operations failed, attempt to confirm the serializability of the sub-operation to determine if the sub-operation can be committed;

after a delay period, reattempt completion of execution of the sub-operation, of the plurality of sub-operations, responsive to the determining that the sub-operation has failed validation based at least in part on an intervening change to data referenced by the sub-operation occurring before the sub-operation has committed, the execution of the sub-operation completing a part of the transaction;

finalize the transaction responsive to successful validation of the sub-operation whose completion was reattempted, wherein the transaction is finalized in response to completion of each of the plurality of sub-operations including the reattempted sub-operation after initial failed validation;

commit the transaction responsive to completion of each of the plurality of sub-operations including the sub-operation whose completion was reattempted after initial failed validation due to an error;

and responsive to determining that a probability of an additional transaction being affected by an intervening transaction is above a threshold level, initiate the additional transaction using the optimistic concurrency model that confirms serializability of the additional transaction prior to committing of the additional transaction.

15. The non-transitory computer-readable storage medium of claim 14, wherein the instructions further comprise instructions that, as a result of being executed by the one or more processors, cause the computer system to at least determine that the sub-operation has failed validation based at least in part on a change to data referenced by the sub-operation.

16. The non-transitory computer-readable storage medium of claim 14, wherein the sub-operation is re-applied after a delay period.

17. The non-transitory computer-readable storage medium of claim 14, wherein the transaction is committed based at least in part on completing each of the plurality of sub-operations.

18. The non-transitory computer-readable storage medium of claim 14, further comprising determining that the sub-operation can be retried.

19. The non-transitory computer-readable storage medium of claim 14, wherein a sub-operation of the plurality of sub-operations, when executed, computes a portion of an index.

20. The non-transitory computer-readable storage medium of claim 14, wherein the sub-operation, when performed, computes a portion of a view.

\* \* \* \* \*